April 2, 1957          G. I. CHIODO          2,787,473
HYDRAULIC FLUID SYSTEM FOR STABILIZING
MOTOR VEHICLES WHEN GOING AROUND CURVE
Filed April 24, 1953          7 Sheets-Sheet 3

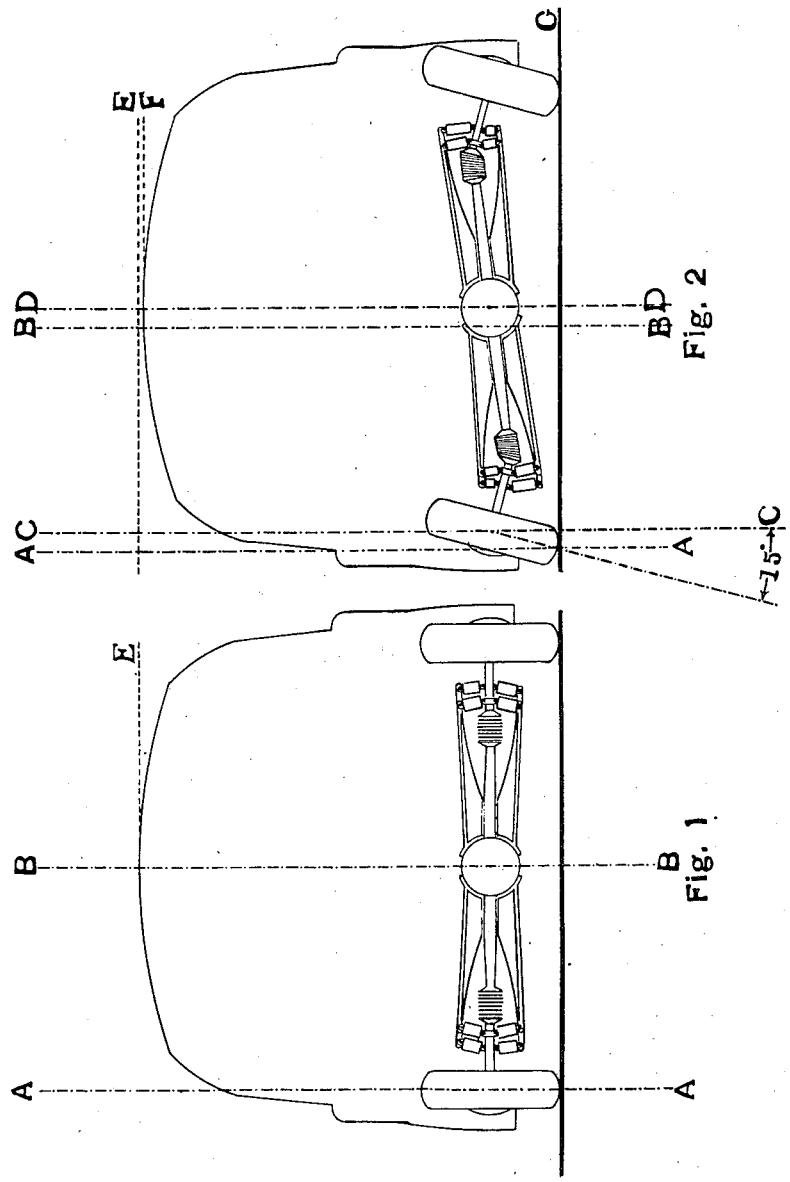

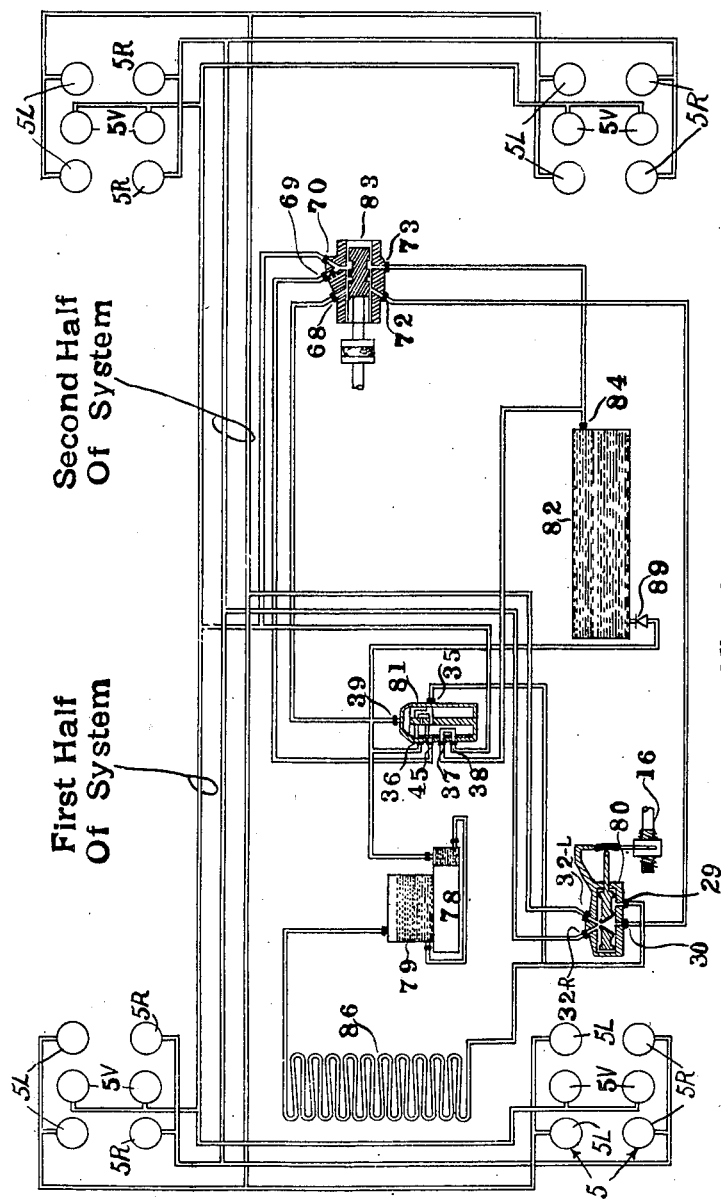

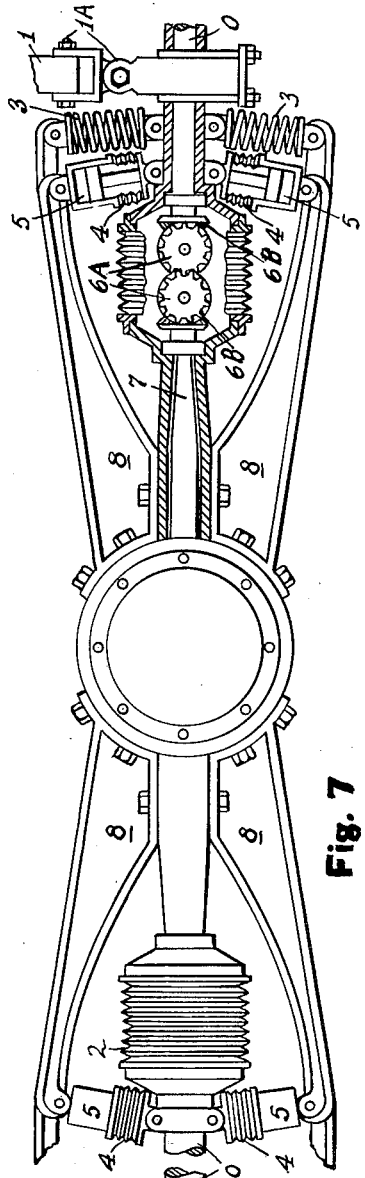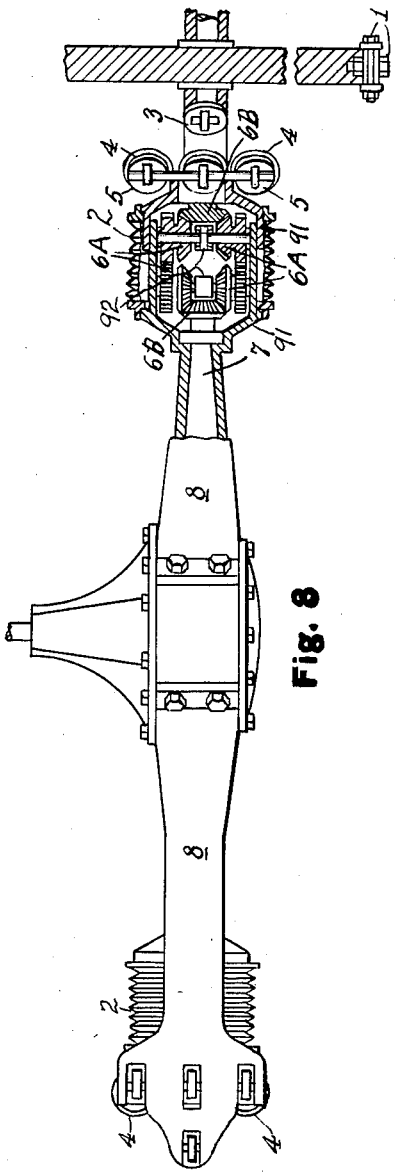

April 2, 1957

G. I. CHIODO 2,787,473

HYDRAULIC FLUID SYSTEM FOR STABILIZING
MOTOR VEHICLES WHEN GOING AROUND CURVE

Filed April 24, 1953

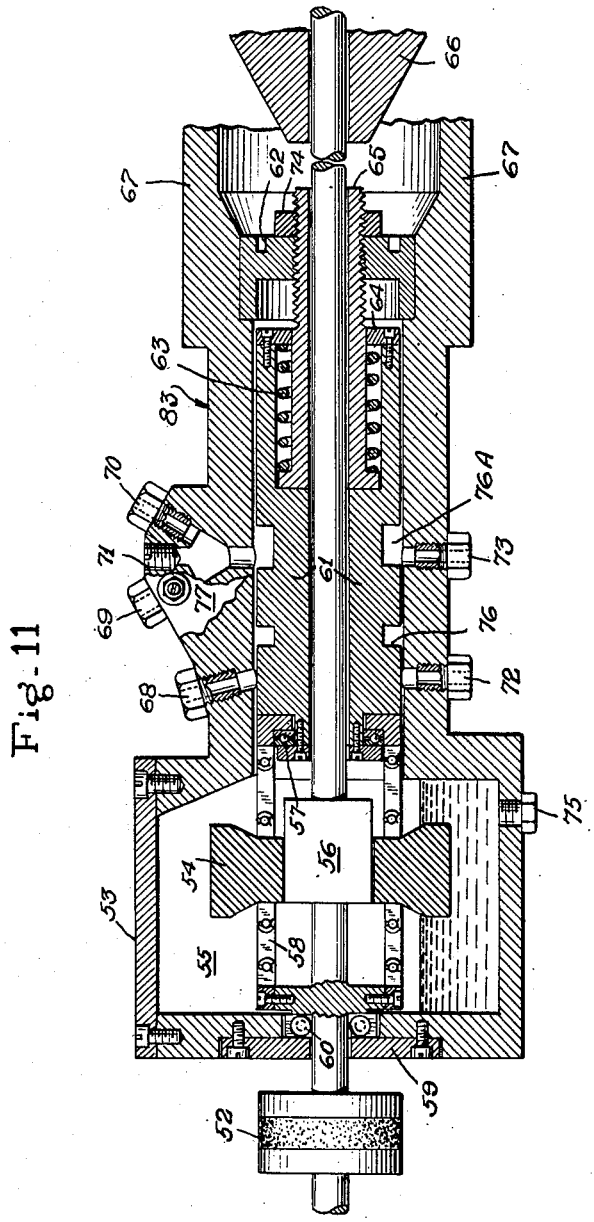

United States Patent Office 2,787,473
Patented Apr. 2, 1957

2,787,473

HYDRAULIC FLUID SYSTEM FOR STABILIZING MOTOR VEHICLES WHEN GOING AROUND CURVE

Giuseppe I. Chiodo, New York, N. Y.

Application April 24, 1953, Serial No. 350,855

22 Claims. (Cl. 280—112)

The present invention relates to a system for stabilizing a vehicle when going around a curve at high speed by counteracting the inertia forces acting on the vehicle by reason of its change in direction.

In accordance with the invention, the inertia, or centrifugal force acting on a vehicle when going around a curve at high speed, is counteracted by:

1. Having the front and rear wheels of the vehicle incline simultaneously inwardly toward the inside of the curve, thereby putting them in a better position to withstand the resultant of the inertia force and gravity.
2. Causing the body of the vehicle to lower itself toward the ground so that the center of gravity of the vehicle is lowered.
3. Causing the body of the vehicle to move inwardly toward the inside of the curve with respect to the engagement of the vehicle wheels with the roadway, thereby creating an off-balance relationship which is opposite to, and hence tends to counterbalance or counteract the inertia force.
4. Providing the vehicle wheels with pneumatic tires having treads with wear-resisting central portions and reinforced side portions having greater anti-skid properties so that, when the wheels are tilted a substantial amount, as when going around a curve at high speed, the anti-skid side portions of the tread engage the roadway and provide greater resistance to skidding.

The invention accordingly provides a system for stabilizing a car when going around a curve at high speed, in which the car is provided with steering means and is supported by a plurality of wheels all of which are tiltable in unison toward the inside of the curve by a hydraulic system acting on all of the wheels, thereby moving the center of gravity of the car inwardly of the curve with respect to the engagement of said wheels with the supporting surface, and in which said hydraulic system comprises two sections, namely a first section comprising hydraulic means associated with said wheels for holding the wheels vertical and a second section comprising hydraulic means associated with the wheels for tilting the wheels to the right or to the left under control of said steering means and a selector controlled by the speed of the car for selectively energizing said first section when the speed of the car is below a predetermined value and for energizing said second section when the speed of the car is above said value.

The invention further provides a system for stabilizing a car when going around a curve at high speed, in which the car is provided with steering means and is supported by a plurality of wheels all of which are tiltable in unison toward the inside of the curve by a hydraulic system acting on all of the wheels, thereby moving the center of gravity of the car inwardly of the curve with respect to the engagement of said wheels with a supporting surface, and in which said hydraulic system comprises a supply reservoir, a pump, a high pressure reservoir, hydraulic means associated with each of the wheels for selectively tilting them and holding them in vertical position and connections between said pump, reservoirs and hydraulic means including two valves connected in series, namely a valve actuated by said steering means to supply pressure fluid to said hydraulic means to tilt the wheels according to the direction the car is turned and a valve actuated by a device responsive to the speed of the car to supply pressure fluid to tilt the wheels only when the car is travelling at a speed above a preselected value.

The nature of the invention and its many advantages will be more fully understood from the following description and claims in conjunction with the accompanying drawings, in which:

Fig. 1 is a schematic rear elevation of a vehicle having its wheels in the normal vertical position.

Fig. 2 is a similar rear elevation of a vehicle having its wheels inclined approximately 15° from the vertical, as when going around a curve. As viewed in Fig. 2, the vehicle would be turning toward the right.

Fig. 3 is a diagrammatic representation of a hydraulic fluid system controlling the tilting of the wheels in accordance with the invention.

Fig. 7 is a rear elevation of the rear axle and rear wheel assembly, portions being broken away and the right hand portion being shown in vertical section.

Fig. 8 is a plan of the rear axle and rear wheel assembly with portions shown in horizontal section and certain portions omitted.

Fig. 11 is an axial section of a speed-responsive selector valve in the system shown in Fig. 3.

Figure 6:
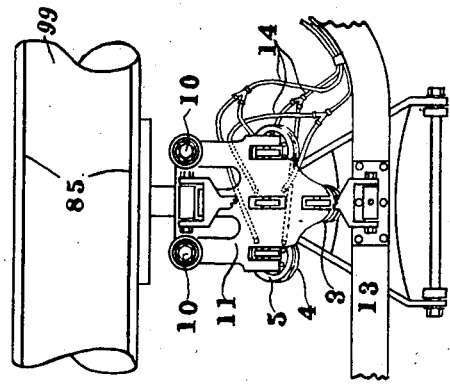
Fig. 6 is a plan of the front wheel assembly shown in Figs. 4 and 5.

When the vehicle is going straight ahead, its wheels are vertical, as shown in Fig. 1. When the vehicle is going around the curve, all of the wheels are tilted simultaneously inwardly to an angular position directly proportional to the rate of speed and degree of turn up to a predetermined maximum of, for example, 15°, as shown in Fig. 2. In Fig. 1, the distance between the line of contact of the wheels with the ground and the center of gravity of the vehicle is A—B while, in Fig. 2, the distance is A—D. Thus, the center of gravity has moved inwardly with respect to the line of engagement of the wheels with the ground a distance A—C or B—D, thereby creating an unbalance which is opposite to, and counteracts, the inertia forces acting on the vehicle when going around a curve. The center of gravity is also lowered by the distance E—F, thereby further decreasing the angle between the ground and a line connecting the center of gravity with the line of contact of the outer wheels with the ground. As will be pointed out more fully below, the tilting of the wheels has the further effect of bringing an anti-skid portion of the tire tread into contact with the ground, thereby further preventing the possibility of skidding.

The front and rear wheels are mounted so as to be tiltable about approximately horizontal axes. Figs. 7 and 8 show a rear wheel and axle assembly in which wheel 100 with a tire 99 has a short axle 0. The frame of the vehicle is supported on the axles 0 close to the wheels by means of springs 1 connected to the frame by universal joints 1A which permit the axles to tilt. Equalizing springs 3, acting between the axles, and supports 8, that are secured to, or part of, the main rear axle housing, tend to hold the axles 0 in horizontal position while tilting of the axles is controlled by means of hydraulic cylinders 5 acting between the axles and the supports 8, the pistons and connecting rods of the hydraulic cylinders being sealed in by bellows enclosures 4. The short axles 0 carrying the wheels are connected to the main rear axles 7 by flexible drives which permit the axles 0 to tilt. The driving connection between the axle sections comprises spaced, facing bevel gears 6B and two pairs of intermediate gears 6A meshing with the bevel gear and with each other. The housings of the axle sections are connected by bracket portions 91 pivotally connected coaxially with one of the intermediate gears 6A of each pair to provide articulation of the axle housing. The intermediate gears 6A are rotatably supported by bearings 92. The flexible drive is sealed in by a bellows enclosure 2.

Figure 5:
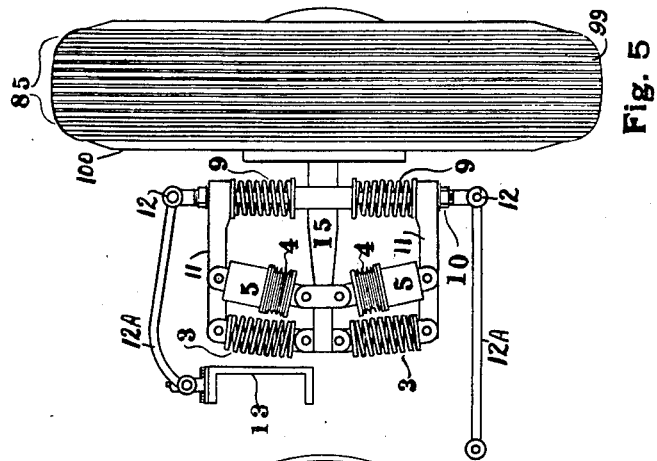
Fig. 5 is a front elevation of a front wheel assembly.
Figure 4:
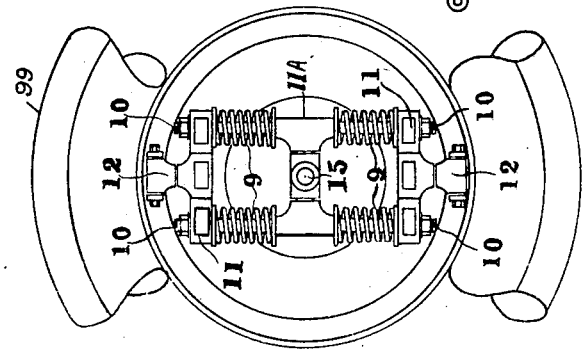
Fig. 4 is a side elevation of a front wheel assembly, portions of the wheel being removed to show the wheel-supporting structure.

Figs. 4, 5 and 6 show a front wheel assembly in which a wheel 100 having a tire 99, is rotatable on a short axle 15 that is tiltably supported by a bracket 11A which is vertically slidable on clamp bolts 10 extending between upper and lower supports 11. Supporting and equalizing springs 9 cooperate with equalizing springs 3 to hold the axle 15 normally in central and horizontal position while the tilting of the axle is controlled by hydraulic cylinders 5 to which hydraulic fluid is supplied through conduits 14. The supports 11 are connected by universal joints 12 to the linkage 12A of the usual front wheel suspension system for supporting the frame 13. The universal joints 12 permit turning the wheels about a substantially vertical axis for steering by means of the usual steering mechanism while tilting of the wheels about a horizontal axis is permitted by the tilting of the axle 15 under control of the hydraulic cylinders 5.

Figure 9:
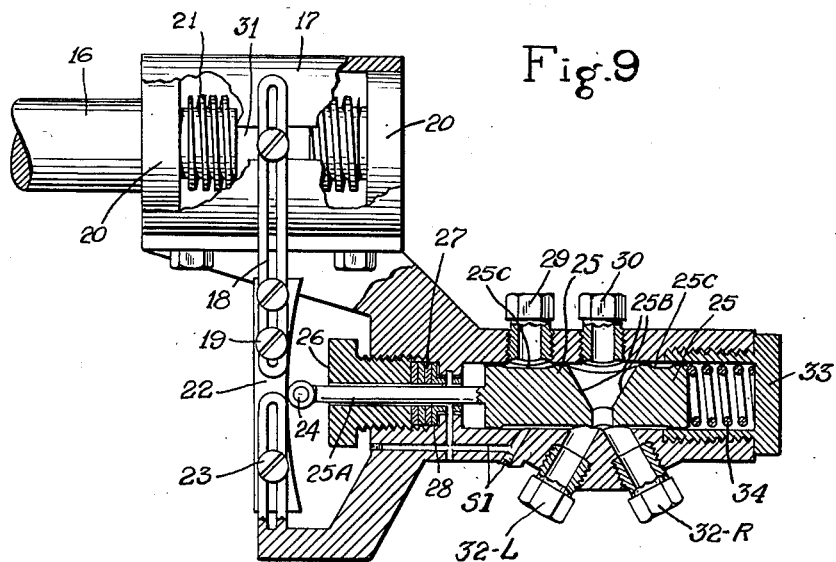
Fig. 9 is an axial section on a larger scale of a differential pressure valve shown in Fig. 3 and attached to, or made part of, the steering wheel assembly.
Figure 10:
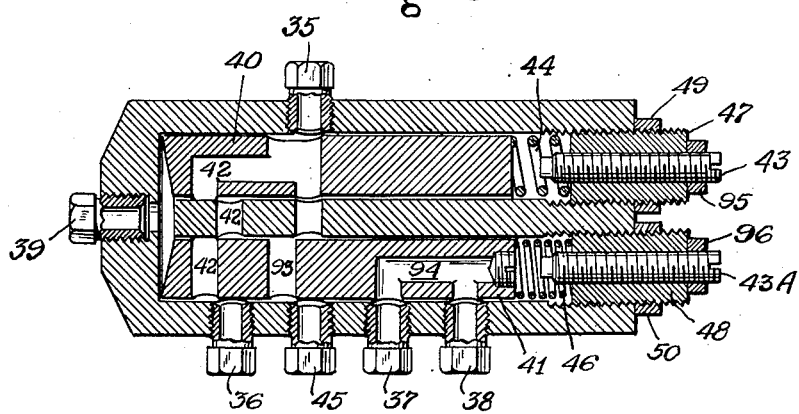
Fig. 10 is an axial section of a balancing pressure relay shown in Fig. 3.

The tilting of the wheels is controlled by a hydraulic system (Fig. 3) comprising a low pressure supply reservoir 79, a high pressure pump 78, a differential pressure valve 80 (Fig. 9), a balancing pressure relay 81 (Fig. 10), a high pressure oil reservoir 82 having an outlet 84 and connected to the pump 78 through a check valve 89, a selector valve 83 (Fig. 11) and a cooling coil 86, together with hydraulic cylinders 5, and the connecting conduits shown in Fig. 3. The cylinders 5 associated with each wheel are shown as comprising a pair of cylinders 5V on opposite sides of the axle for holding the axle vertical, a pair of cylinders 5L on the same side of the axle for tilting the axle and wheel to the left and a similar but opposite pair of cylinders 5R for tilting the axle and wheel to the right. The system comprises three circuits which may be divided into two groups. One group consisting of one of the three circuits is designated the "first half of the system" and comprises connections for supplying hydraulic fluid to opposed cylinders 5V for holding the wheels vertical. The other group, designated "second half of the system," consists of the two remaining circuits for supplying hydraulic fluid alternatively to cylinders 5L for tilting the wheels to the left or to cylinders 5R for tilting them to the right. A basic concept of the hydraulic system is to predetermine the rate of speed at which it is deisred to have the front and rear wheels tilt simultaneously to an angular position directly proportional to the rate of speed and degree of turn.

The differential pressure valve 80 (Fig. 9) is actuated by the steering shaft 16 of the vehicle to determine both the direction and degree of tilting of the wheels. The steering shaft 16 turns a worm gear 21 rotating in bearings 20 and enclosed in a housing 17. A worm gear travel nut 31 engaging the worm gear 21 is connected by linkage 18 and set screw 19 to a link 22 that is adjust- ably pivoted at 23 and engages a roller 24 on an extension 25A of a cylinder valve 25. A fluid tight sliding seal is provided by a gland nut 26, packing 27 and a bushing 28, having a fluid bypass 51, as shown. A spring 34 adjustably held by a screw plug 33 tends to move the slide valve 25 toward the left to keep the roller 24 in engagement with the link 22. Hence, any movement of the steering shaft 16 from its straight-ahead position will force the slide valve 25 to move accordingly to one side or the other of its neutral position. The casing of the valve 80 has an inlet port 30 to which pressure fluid is supplied from the selector valve 83—when the vehicle is travelling above a predetermined speed, as explained below—and a discharge port 29 connected through the cooler 86 to the reservoir 79 (Fig. 3). Opposite the inlet port 30, there are two outlet ports 32L and 32R which join in a V and are connected respectively to the cylinders 5L and 5R for tilting the wheels to the left or right. In neutral position, a cone-shaped opening 25B in the valve slide 25 is centered exactly above the ports 32L and 32R. On either side of the cone-shaped opening, the valve slide 25 has interconnected annular recesses 25C permitting a restricted flow of fluid from the inlet port 30 through the conical opening and annular recesses to the discharge port 29 from which it returns to reservoir 79. This results in a pressure drop and the remaining pressure, considered a differential pressure, is equally distributed to the two ports 32L and 32R and consequently to the hydraulic cylinders 5L and 5R of the front and rear wheels. The equal forces exerted above and below the axles will maintain the wheels firmly in vertical position. The slightest movement of the steering shaft 16 in either direction will cause corresponding movement of the valve slide 25 from its neutral position. This movement will cause a variation of the differential pressure in ports 32L and 32R by permitting a greater or less pressure drop to occur. This difference in pressure value applied respectively to the cylinders 5L and 5R causes the front and rear axles to tilt from the horizontal position to an angular position the degree of which corresponds to the amount the steering shaft 16 has been turned.

The balancing pressure relay 81 (Figs. 3 and 10) is responsive to the output pressure of the pump 78 which is connected to the port 39 of the valve. The pressure from the pump sets on a high pressure piston 40 against the action of a spring 44 adjustable by a set screw 47 and a low pressure piston 41 against the action of a lighter spring 46 adjustable by a set screw 48. The travel of the pistons 40 and 41 is adjustable by set screws 43 and 43A and suitable lock nuts 49, 50, 95 and 96 are provided for locking all of the set screws.

The balancing pressure relay 81 serves the following functions:

1. When the "second half of system" is operating, a constant pressure is supplied to the differential pressure valve 80, eliminating all pressure fluctuations produced by the oil pump 78 which is subject to engine speed. This is accomplished by regulating the tension of the spring 44 so as to set the yield point of the piston 40 at the desired pressure. When this yield point is reached, fluid is permitted to flow through passageways 42 from the inlet port 36 connected to the pump to the outlet port 35 connected to the low pressure reservoir, thereby dissipating the excess pressure.

2. When the "first half of system" is operating with the vehicle moving at a rate of speed below the selected minimum speed for tilting of the wheels, a constant supply of oil to the pump 78 is permitted by flow of fluid from port 36 back to the reservoir 79 through port 35. If the pump pressure is not high enough to move the piston 40 to the right but is above the minimum amount required to move the low pressure piston 41 to the right, fluid from the restricted port 69 of the selector valve 83 (described below), is allowed to bleed back through port 45, passage 93 and port 35 to the supply reservoir 79, thus maintaining the correct balance of pressure in the high pressure reservoir 82.

3. When the vehicle is moving at any rate of speed and the oil pump 78 accidentally fails to provide fluid pressure for any reason whatsover, the wheels of the vehicle are locked in a vertical position regardless of the speed and degree of turn of the vehicle. This "emergency" action takes place as soon as lack of fluid pressure permits the low pressure piston 41 to be moved to the left by its spring 46 so as to bring the passages 94 in position to connect port 37 from the high pressure reservoir 82 to the "first half of system" through port 38. This supplies fluid pressure from the reservoir 32 to the opposed pistons 5V, thereby holding the wheels in vertical position. The movement of the piston 41 to the left also cuts off port 45 and thereby stops the bleed of fluid from the high pressure reservoir 82 through the restricted port 69 of valve 83, thereby conserving the fluid pressure. Preferably a signal light or pressure gauge is also provided for indicating failure of the pump.

The selector valve 83 (Figs. 3 and 11) provides control of the hydraulic system in accordance with the speed of the vehicle. The valve is actuated by a governor 54 on the vehicle drive shaft 56 having a universal drive coupling 52 and bearings 60. The governor is enclosed in a housing 55 provided at one end of the valve casing and having a removable cover 53, bearing plate 59 and drain plug 75. The governor 54 is connected by linkage 58 and thrust bearing 57 to a cylinder valve 61. The action of the governor 54 on the cylinder valve 61 is resiliently opposed by a spring 63 which acts between a thrust plate 64 on the valve member and a flange on the inner end of an adjustment screw 65 which extends through a bushing 62 in the valve casing and is provided with a lock nut 74. By adjusting the tension of the spring 63 by means of the adjustment screw 65, the speed at which the governor 54 moves the cylinder valve 61 and the extent of such movement is determined. A portion of the rear axle housing and pinion shaft is shown at 66. The valve housing is suitably supported by brackets 67. The valve 83 has an inlet port 68 connected to the pump, an outlet port 72 leading to the steering control valve 80, a port 73 connected with the high pressure reservoir 82, a port 70 connected to the "first half of system" for holding the wheels vertical, a bleed port 69 adjustably restricted by a throttle valve 77 and a filling and flushing opening closed by a plug 71.

The spring 63 of the selector valve 83 is adjusted so that the valve performs the following functions:

1. At a rate of speed above a predetermined minimum speed, the wheels are caused to assume an angular position directly proportional to the rate of speed and the degree of turn of the vehicle. This is accomplished by movement of the cylinder valve 61 toward the left by the governor 54 so as to bring an annular groove 76 progressively into position to connect supply port 68 from the pump to port 72 leading to the steering control 80.

2. At a rate of speed below the selected minimum speed, the wheels are maintained in a vertical position regardless of whether the steering wheel is turned or not. This is effected by the cylinder valve 61 being in its right hand position, as shown (Fig. 11), so as to provide communication between the port 73 from the high pressure reservoir 82 and the port 70 connected to the "first half of system" for keeping the wheels vertical. The adjustable bleed port 69 connected to the port 45 of the balancing pressure relay 81 (Fig. 10) provides for bleed of fluid from the high pressure reservoir so as to maintain the pressure at a selected value. However, as described above, this bleed is cut off by movement of the low pressure piston 41 of valve 81 to the left in the event of failure of the pump.

With the system described, it will be seen that the wheels are kept vertical:

1. When the speed of the vehicle is below a selected minimum value, for example 15 miles per hour.
2. When the car is standing still or there is a failure of the pump, so that no pressure is supplied by the pump.
3. When the car is travelling straight ahead at any speed.

Otherwise, the wheels are tilted in proportion to the speed and the degree of turning of the vehicle.

Figures 12, 13:
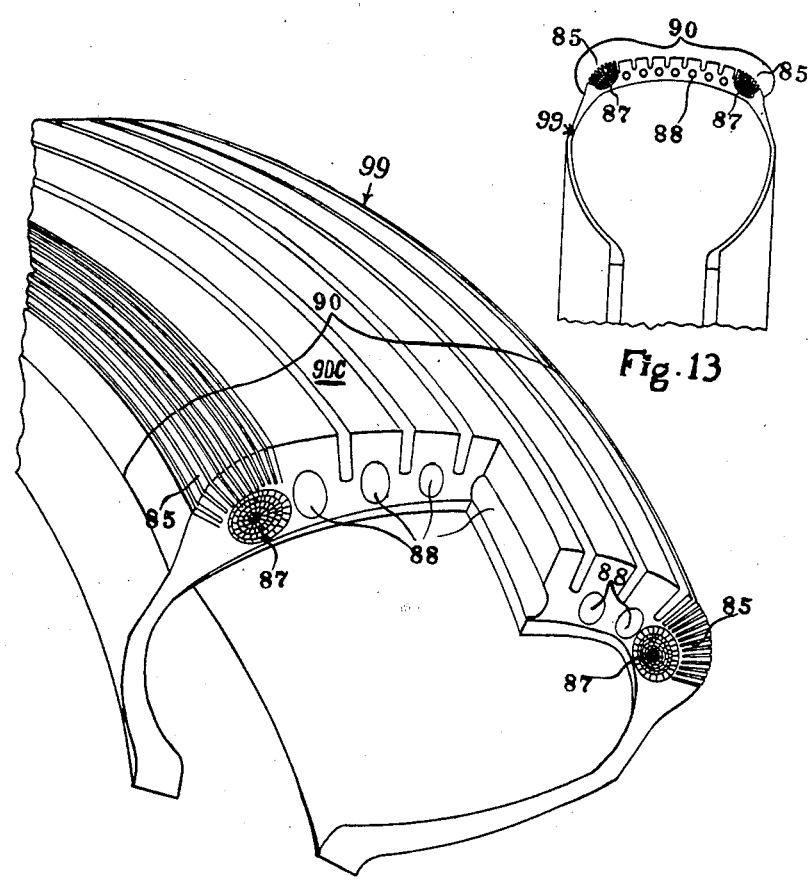
Fig. 12 is a fragmentary perspective and cross sectional view showing a pneumatic tire having a tread structure that cooperates with the other elements of the system in counteracting the inertia forces of a vehicle going around a curve.
Fig. 13 is a cross section of the tire on a smaller scale.

The effectiveness of the system in accordance with the invention is further increased by providing the wheels with pneumatic tires 99 of the construction shown in Figs. 12 and 13. The tire tread 90 has a central portion 90C that is designed to resist wear while side portions 85 of the tread, disposed at an angle of approximately 15° from the central plane of the tire, are provided with fine comb treads designed to prevent sideways skidding. When the vehicle is going straight ahead with the wheels vertical, the wear-resisting central portion of the tread takes most of the load. When the wheels are tilted, as when going around a curve, the comb treads 85 are brought into full engagement with the roadway and, being fine and deeply cut, will crush under the off-balanced weight of the vehicle, forcing the fine edges of the tread into the ground grooves and thereby providing a strong skid-resisting grip. The side portions of the tread are reinforced by cord structures 87 which prevent excessive deformation of the tire under the off-balanced weight of the vehicle and back up the comb tread portions 85. The tire tread is oval in cross section and the central portion of the tread is provided with a plurality of circumferentially-extending cavities 88. The oval shape of the tread permits the wheels to tilt to any desired angle while the cavities 88 permit the tread to adapt itself to the roadway regardless of the angle of tilt so as to provide adequate contact areas. The cavities 88, in addition, will relieve the oval top tread 90 from undue wear caused by over-inflation of the tire. Excess air pressure existing in the tire tube will give the internal structure of the tire casing a rigid toroidal form but will not affect the top tread since the cavities 88 permit the tread to adapt itself to the road surface regardless of whether the wheels are vertical or tilted. Instead of the cavities 88 being hollow, they may, if desired, be filled with foam rubber or any other elastic material able to recover quickly from depression.

While a preferred embodiment of the invention has been shown and described, it will be understood that this is merely by way of example and is not to be considered as limiting.

What I claim as new, and desire to secure by Letters Patent of the United States, is:

1. A system for stabilizing a car when going around a curve at high speed, said car being provided with steering means and being supported by wheels which are tiltable about horizontal axes to positions inclined with respect to the vertical, said system comprising a hydraulic system acting on all of said wheels and divided into two sections namely a first section comprising hydraulic means associated with each of said wheels for holding the wheels in normal vertical position and a second section comprising hydraulic means associated with each of said wheels for tilting the wheels to the right or to the left and means activated by said steering means to control the tilting of said wheels to tilt the wheels toward the right or left when the car is turned toward the right or left respectively, and a speed-responsive selector controlled by the speed of the car and selectively energizing said first section when the speed of the car is below a predetermined value and for energizing said second section when the speed of the car is above said value.

2. A stabilizing system according to claim 1, in which said hydraulic system includes a supply of hydraulic fluid under pressure and in which said second section includes a valve actuated by said steering means and controlling the supply of hydraulic fluid to said tilting means to tilt the wheels in proportion to the amount the steering means is turned from straight ahead position.

3. A stabilizing system according to claim 1, in which a power driven pump supplies hydraulic fluid under pressure to both sections of said system.

4. A stabilizing system according to claim 3, in which a pressure responsive valve controls the pressure of hydraulic fluid supplied by said pump to said sections to maintain said pressure substantially constant at a preselected value.

5. A stabilizing system according to claim 4, in which said pressure control valve is adjustable to set the pressure at different values.

6. A stabilizing system according to claim 1, in which said hydraulic system includes a power driven pump for supplying hydraulic fluid under pressure to both sections of said system and a pressure reservoir maintaining a supply of fluid under pressure for use in the event of failure of said pump.

7. A stabilizing system according to claim 6, in which said reservoir is connected with said pump through a check valve permitting flow of pressure fluid from the pump to said reservoir and preventing return flow.

8. A stabilizing system according to claim 7, in which said hydraulic system further includes a low pressure reservoir connected to the inlet side of said pump and connections including a pressure responsive valve and flow restricting means between said pressure reservoir and said supply reservoir to provide for restricted flow of fluid from said pressure reservoir to said supply reservoir and thereby maintain the pressure in said pressure reservoir substantially constant at a predetermined value.

9. A stabilizing system according to claim 6, in which means including a pressure responsive valve are provided for connecting said first sections of the hydraulic system to said pressure reservoir when the pressure delivered by said pump falls below a predetermined minimum value to energize said first section and thereby restore the wheels to vertical position in the event of pump failure.

10. A system for stabilizing a car when going around a curve at high speed, said bar being provided with steering means and being supported by wheels which are tiltable about horizontal axes to positions inclined with respect to the vertical, said system comprising a hydraulic system for tilting all of said wheels in unison toward the inside of the curve to move the center of gravity of the car inwardly of the curve with respect to the engagement of said wheels with a supporting roadway surface, said hydraulic system comprising a supply reservoir, a pump, a high pressure reservoir, hydraulic means associated with each of the wheels for selectively tilting them and holding them in vertical position and connections between said pump, reservoirs and hydraulic means including two valves connected in series, namely a valve actuated by said steering means to supply pressure fluid to said hydraulic means under variable pressure to tilt the wheels a variable amount according to the direction and degree the said steering gear is actuated to turn the car and a valve actuated by a device responsive to the speed of the car to supply pressure fluid to tilt the wheels only when the car is travelling at a speed above a preselected value.

11. A stabilizing system according to claim 10, in which said hydraulic means associated with each of said wheels includes means for holding said wheels in normal vertical position and in which said connections further include a valve responsive to the output pressure of said pump for connecting said high pressure reservoir to said hydraulic means to hold the wheels vertical in event of failure of the pump.

12. A stabilizing system according to claim 10, in which said wheels are rotatable supported by axles that are tiltable about axes spaced slightly inwardly of the wheels and in which the car comprises a body and means for resiliently supporting said body on said axles close to the wheels.

13. A stabilizing system according to claim 12, in which said wheels include driving wheels and in which each of the driving wheel axles comprises two sections connected by an articulated joint to permit tilting of the wheels.

14. A stabilizing system according to claim 13, in which each of said articulated joints comprises a bevel gear on one axle section, a facing bevel gear on the other axle section and pairs of gears rotating about horizontal axes and meshing with each other, one gear of each pair meshing with one of said bevel gears and the other gear of each pair meshing with the other bevel gear.

15. A stabilizing system according to claim 10, in which the said wheels are rotatably supported by axles that are tiltable about axes spaced slightly inwardly of said wheels and in which the hydraulic means associated with the wheels comprises hydraulic cylinders and pistons acting on said tilting axles.

16. A stabilizing system according to claim 15, in which said hydraulic cylinders and pistons comprises one set of cylinders and pistons for holding the axle horizontal and the wheel vertical and a second set of cylinders and pistons for tilting the axle and wheel.

17. A stabilizing system according to claim 16, in which said first set of cylinders and pistons includes at least one cylinder above the axle and at least one cylinder below the axle, said cylinders being supplied with hydraulic fluid simultaneously and acting against one another to hold the wheel in vertical position.

18. A stabilizing system according to claim 16, in which said second set of cylinders and pistons includes at least one cylinder above the axle and at least one cylinder below the axle, said cylinders being supplied with hydraulic fluid alternatively to tilt the axle and the wheel mounted thereon in one direction or the other.

19. A stabilizing system according to claim 15, in which equalizing springs act on said axles and tend to hold them in horizontal position.

20. A stabilizing system according to claim 10, in which the wheels are equipped with pneumatic tires having treads with wear-resisting central portion and reinforced side portions having greater anti-skid properties so that when the wheels are tilted a substantial amount as when going around a curve at high speed the anti-skid side portions of the tread engage the roadway and provide greater resistance to skidding.

21. A stabilizing system according to claim 20, in which the tire tread is oval in cross section and in which circumferentially extending cavities are provided inside the central portion of the tread to permit the road-engaging portion of the tread to flatten and engage a greater area on the roadway regardless of the angle the wheel makes with the roadway.

22. A stabilizing system according to claim 21, in which said cavities in the tread of the tire are filled with reticulated rubber composition.

References Cited in the file of this patent

UNITED STATES PATENTS

| | | |
|---|---|---|
| 2,260,102 | Freret | Oct. 21, 1941 |
| 2,279,120 | Hurley | Apr. 7, 1942 |
| 2,353,503 | Rost et al. | July 11, 1944 |
| 2,474,471 | Dolan | June 28, 1949 |
| 2,650,107 | Monnig | Aug. 25, 1953 |

FOREIGN PATENTS

| | | |
|---|---|---|
| 521,741 | Great Britain | May 30, 1940 |